United States Patent [19]

Piercy

[11] 3,841,690

[45] Oct. 15, 1974

[54] COMPARTMENT CLOSURE AND SUPPLEMENTAL VEHICLE BODY

[76] Inventor: Paul L. Piercy, 1630 Lucia Ave., Louisville, Ky. 40204

[22] Filed: Aug. 7, 1972

[21] Appl. No.: 278,352

[52] U.S. Cl. ............... 296/10, 296/137 B, 296/13
[51] Int. Cl. ................................................ B62c 1/06
[58] Field of Search ............ 296/24 R, 10, 23 R, 26, 296/27, 3, 6, 7, 8, 9, 13, 14, 32, 36, 100, 137 B; 280/179 R, 179 A; 267/57 R

[56] References Cited
UNITED STATES PATENTS

| | | | |
|---|---|---|---|
| 1,780,277 | 11/1930 | Seeley et al. | 280/179 R |
| 2,951,548 | 9/1960 | Crockett et al. | 267/57 |
| 3,069,199 | 12/1962 | Reardon et al. | 296/24 R |

*Primary Examiner*—David Schonberg
*Assistant Examiner*—John A. Carroll

[57] ABSTRACT

Discloses a compartment closure of a pickup truck which converts to a supplemental vehicle body. The compartment closure and supplemental vehicle body comprises a pair of sidewall sections, pivotably mounted along the sidewall panels of the pickup truck. The sidewall sections, when disposed horizontally, cooperatively act as a closure for the truck and when disposed vertically in alignment with the sidewall panels of the pickup truck, act as a supplemental body. Means for urging the heavy sidewall sections from their horizontal position to a vertical position comprises a pair of torsion bars disposed longitudinally along the inner surface of the sidewall panels and fixedly secured under tension to the truck body. A novel latch mechanism, which acts to lock the compartment closure and tailgate is also disclosed.

21 Claims, 12 Drawing Figures

COMPARTMENT CLOSURE AND SUPPLEMENTAL VEHICLE BODY

FIELD OF THE INVENTION

This invention relates to motor vehicle bodies and more particularly, relates to new and improved attachments for conventional pickup type motor truck bodies. More specifically, this invention relates to a compartment closure for the open compartment of a conventional pickup truck, which is convertible to a supplemental vehicle body for use in hauling grain, in hauling animals or other cargo, or as a camper.

DESCRIPTION OF THE PRIOR ART

Conventional type truck bodies usually include a substantially horizontal longitudinally extending bed which is secured to the vehicle chassis frame. A pair of transversely spaced sidewall panels attach to the side marginal edges of the supporting bed and extend vertically a short distance above the level of the supporting floor. A front panel connects the forward ends of the side panels adjacent to the ends of the operator's compartment and a tailgate is pivotably connected at the rear end of the vehicle. Because of the relatively short height of the side panels, the carrying capacity of a pickup truck is fairly limited. As a consequence, various racks have been proposed which fit in the stake holes of the side panel members but these are heavy and unsightly. The racks have been, for the most part, homemade, consisting of a series of permanent posts and permanent bars or boards, preferably made of oak or other strong hardwood which, when in use, fit into the stake holes provided in the truck bed. When not in use, the rack portions should be removed from the stake holes and placed in a storage spot. Because of the necessity for strength for hauling animals, a rack portion is of considerably weight which normally necessitates two men to lift it on and off the truck and into position onto the truck bed. Furthermore, unless suitable storage facilities are available, the rack portions are exposed to weather and to injury. Such racks, however, are still not useful for hauling cargo, such as grain, and do not fulfill the requirement often dictated of providing a locked storage compartment in the rear of the pickup.

Proposals have been provided in the past to provide a permanently arranged rack having hinged posts which could either be folded inwardly to reduce the size of the rack, such as was disclosed in U.S. Pat. No. 2,224,126, or folded outwardly to provide a lateral platform, such as disclosed in U.S. Pat. No. 2,856,225. In either event, the rack was still visible and was not completely stored away. The major problem, however, was that in order to secure sufficient strength in the rack for essentially all uses and particularly for the use of hauling livestock, the rack was of such weight that removing it from the truck after use was a burdensome problem, or the method of storing it permanently within the truck was such that some means other than muscle power was required to raise the rack from one position to the other. Thus, as early as 1892, Plomberg used a winch type arrangement to raise a portion of his rack from one position to another in U.S. Pat. No. 481,420. The most prevalent method, however, of utilizing a means for urging the framework of the rack upwardly has been the use of springs. See, for example, Boultinghouse in U.S. Pat. No. 2,997,330; Koch et al. in U.S. Pat. No. 3,048,438 and Piercy in U.S. Pat. No. 3,460,864. In the latter two applications, however, the springs were used primarily to move the rack or framework vertically. Accordingly, several springs were required, which in the course of time required adjustment and which were required to be lubricated often so as to be operatable over a long period of time. In the case of Boultinghouse, who moved his cover members from a vertical position inwardly forming a compartment closure, a coil spring and linkage arrangement were disclosed near the front end of the truck bed. This, however, was suitable only for a lightweight rack, since such an arrangement would not be at all operative, with a rack of any substantial weight without introducing a similar linkage and coil spring arrangement at the rear or at least at the center of gravity of the wall section sides. Such a spring and linkage at the rear would block a passage into the truck's compartment.

SUMMARY OF THE INVENTION

According to the present invention, torque is applied to the relatively heavy side sections through the use of a pair of torsion bars disposed along the inner surface of the side panels of the truck bed. The torsion bars are mounted immovably at either end of the truck bed, under tension. A torque arm is mounted in operative relation at each end of the sidewall sections so as to urge the sections upwardly through an arc from the closed position in the horizontal plane to the open position in a vertical plane. As the side sections move from the vertical plane back to the horizontal plane, torque is impressed on the torsion bar through the torque arms connected to the sidewall sections. By use of these relatively long and rugged torsion bars, the side wall sections swing smoothly through an arc from closed to open position and from open to closed position. Field adjustment for tension is eliminated. The torsion bars themselves are practically indestructible. Further, in one embodiment, a cargo fence is disclosed which swings gravitationally downwardly to form a compartment in the rear of the pickup truck compartment so as to allow items to be stored in the rear without inching forwardly during a relatively long trip. Further, a unique latch means is disclosed, whereby the closure member can be closed and locked into position so that there is provided a locked compartment for carrying camping equipment, hunting equipment or other valuable cargo.

DESCRIPTION OF THE PREFERRED EMBODIMENT

Figure 1:
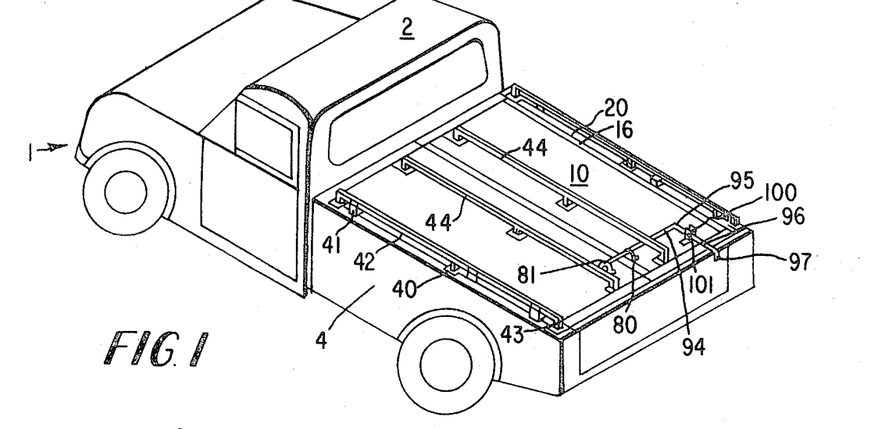
FIG. 1 is a view in perspective of the compartment closure and the supplemental vehicle body of my invention in use on a pickup truck as a compartment closure.
Figure 2:
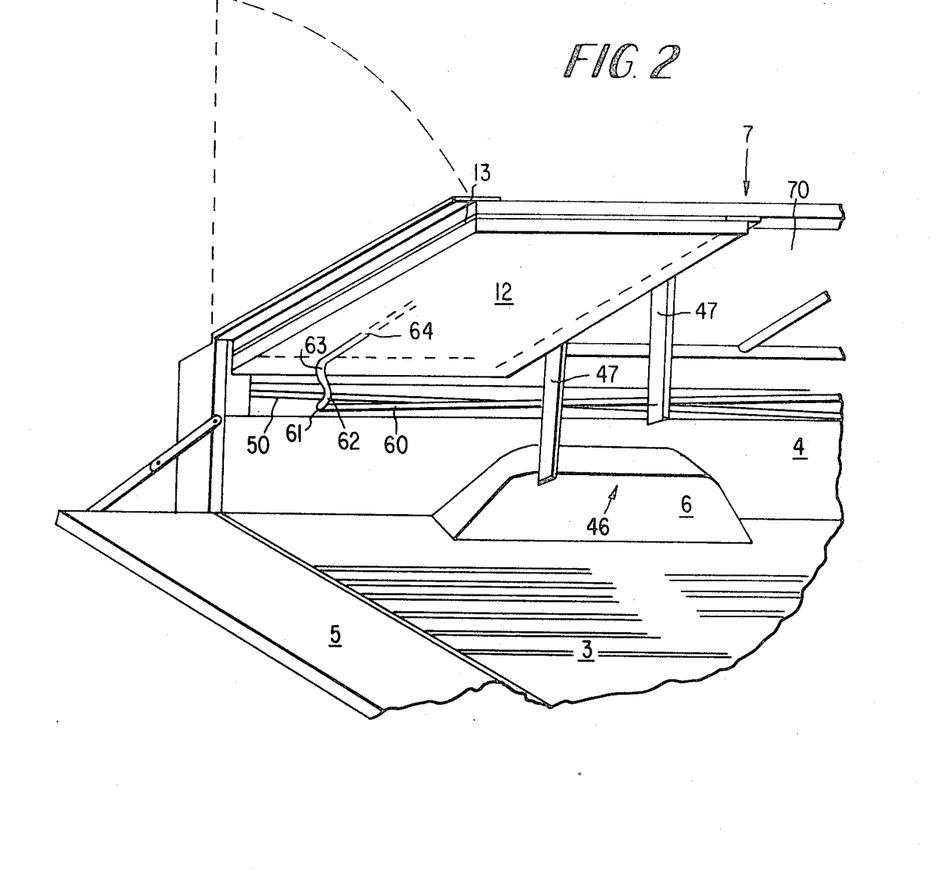
FIG. 2 is a fragmentary view in perspective illustrating the compartment closure of my invention in partially open position and illustrating the cargo fence.
Figures 2A, 3:
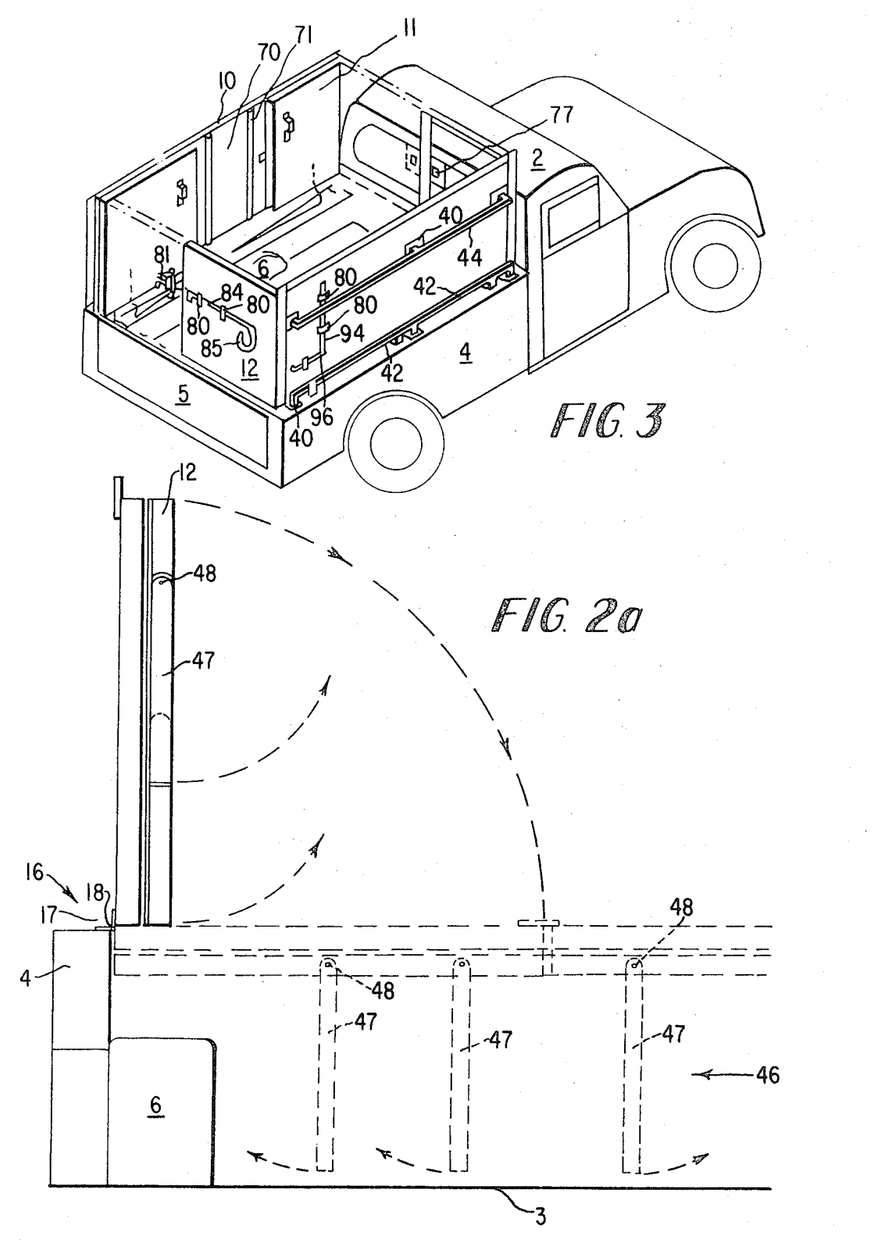
FIG. 2A is an elevational view directed toward the rear of the bed of the truck illustrating in full lines the side and rear sections of the supplemental vehicle body and in dotted lines the sections serving as a compartment closure disposed in a horizontal plane and illustrating further the slats forming the cargo fence.
FIG. 3 is a view in perspective, illustrating the wall sections forming the supplemental vehicle body disposed in a vertical position.

Referring now to the drawings in detail, FIG. 1 illustrates the compartment closure and supplemental vehicle body of my invention in closed position. FIG. 3 illustrates it in open position wherein the sidewall sections are in vertical alignment with the side wall panels of the pickup truck compartment.

As has previously been indicated, the pickup truck is an unusually useful implement, particularly around small farms, but is butject to several important disadvantages. One of the disadvantages is the fact that the side and end wall panels forming the side and rear walls of the open compartment are not sufficiently high for hauling many forms of cargo, thus, necessitating a rack. A rack, particularly if used in hauling livestock, must be of considerable weight and strength so that the weight of such a rack makes it particularly burdensome and heavy. This requires a great deal of strength and manpower to mount and dismount the rack in the stake holes provided therefor. A further disadvantage of the pickup truck generally has been its openness for cargo left in the rear compartment. Since there is only limited cab area, it has been essentially impossible to carry larger valuables in the back of the truck and leave the vehicle unattended, since this would be an open invitation for thievery and pilferage. For this reason, among others, campers have come into style which in a retracted position can be used to carry valuable camping equipment such as rifles, fishing tackle, etc. In an extended position, the campers can be used as sleeping quarters. Again, of course, the campers are of specific utility and cannot be used very successfully for hauling livestock or for hauling grain or other agricultural uses such as are possible with the compartment closure and supplemental vehicle body of this invention.

Referring now specifically to the drawings, a pickup truck is indicated generally as 1, having a cab 2, a truck bed 3, side wall panels 4 and a pivotable tailgate 5. Numeral 6 indicates the conventional fender well. The members making up the closure member in the vehicle body are indicated generally as side wall section 10, a front wall section 11, and an end wall section 12. The front and end wall sections are made up of two leaflike members, each leaflike member being pivotably connected to the edge of the side wall sections 10 by means of a continuous hinge 13, consisting of pin 14 and hinged leaves 15. The side wall sections 10 are hingedly connected to the sidewall panels 4 of the pickup truck compartment by means of the continuous hinge 16 comprising pin 18 and leaves 17. This hinge is covered by vinyl covering 20 to protect it from the weather, animal excretia and the elements.

As was previously mentioned in order to be of sufficient strength and stability for the varied uses to which this invention is directed, the wall sections 10 and the front and rear wall sections 11 and 12 of the compartment closure and supplemental vehicle body must be of exceptional sturdiness and strength. I have found a preferred material produced by Reynolds Metals Company which consists of aluminum deck sections 22. Each section 22 consists of a surface plate 23, a web 24 connecting it to a supporting foot 25. An exterior groove 26 is provided in general alignment with each web 24. Each of the aluminum deck sections 22 are fitted with another aluminum deck section by means of a pressure joint 27 consisting of a rounded fillet member 28 fitted into a pressure groove 29 having a relatively small radius. At one end of the aluminum deck section is a large engagement foot 32 containing an inwardly projecting pressure groove 33 against which fits a short pressure foot 34 connected to the web 24. These members, it has been found, form an extremely strong and solid compartment onto which a suitable inner skin such as tempered masonite 70 or other waterproof materials can be applied. Since the pressure joints 27 are constructed for downward vertical pressure, I found it desirable to use stiffening half round members 71 bolted to the aluminum deck section so as to prevent the joints from bowing outwardly.

This material or other similar materials form a completely solid, strong wall of substantial weight and strength. However, the weight and strength provided by this material presents a problem in that the side sections 10 are extremely heavy and hard to pull from horizontal to vertical position. This is, of course, complicated by the fact that one of the side members must be pulled from the middle by a peson standing on the outer edge of the truck, where he has little leverage. Further, there is little space into which to apply or mount springs or other conventional tensioning means to urge the side sections upwardly.

On the exterior surface of the sidewall panels 4 of the truck compartment are located a series of aluminum feet 40 over stake holes 45. Aluminum stop rail 42 is bolted into position by means of end bracket 43. The entire assembly is reinforced by means of reinforcement angle brackets 41. The stop and tiedown rails act to limit the movement of the heavy sidewall sections 10 past the vertical plane. Thus, if the sidewall section goes past its vertical posture in alignment with sidewall 4, the rail 42 acts to limit that movement and therefore prevents the continuous hinge 16 from being torn off the sidewall. A similar arrangement is provided for the handle and tiedown rail 44 except that the end brackets 43 are not mounted over the stake holes 45 but are mounted toward the free end of the sidewall sections 10. Thus, as previously mentioned, to open the sidewall member 10 from its closure compartment posture, a person would stand at the edge of the truck, reach over and grasp handle rail 44 and pull upwardly so as to pull the sidewall sections through an arc, as shown in FIG.

2. Since a person's leverage is limited in that position, considerable strength is required to pull the sidewall members 10 upwardly. I have provided this in the form of torque by means of torsion bars 50. The torsion bars 50 are mounted immovably under pressure to angle iron 51 near the stake holes 45 by means of stub 52. The body of the torsion bar runs coaxially with the side wall panel member 4 of the pickup truck compartment to the other end 60 where it is bent at a 90° angle at point 61, and bent again at a 45° angle at a point 62 and at point 63 to form torque arm 64 which projects upwardly into sidewall sections 10. The torque arm 64 is fitted actually through holes (not shown) drilled through each of the webs 24 forming the supporting structure for the aluminum deck sections 22. Thus, torque is applied to the sidewall sections at both the front and rear end and the sidewall section 10 swings with its free end through an arc smoothly and easily with just a little lifting pressure provided on handle and tiedown rail 44. As the sidewall section 10 moves from the vertical position through an arc down to the horizontal plane in the compartment closure posture, torsion is impressed upon the torsion bars 50 by means of the torque arm 64. As previously mentioned, the leaflike members of the front wall sections 11 and the end wall sections 12 are each pivotably connected to the front and rear edge of sidewall sections 10 respectively by means of a continuous hinge 13.

Figure 4:
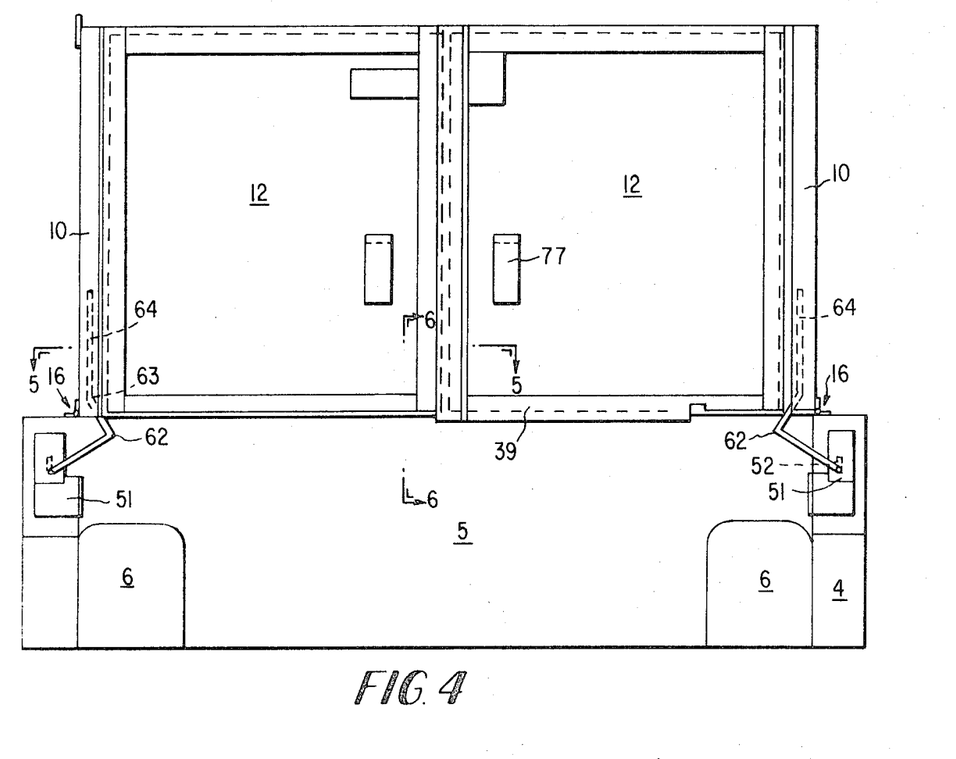
FIG. 4 is an elevational view directed toward the rear illustrating the leaflike members forming the rear supplemental vehicle body sections and illustrating the relationship thereto of said leaf-like members to the tailgate.
Figure 7:
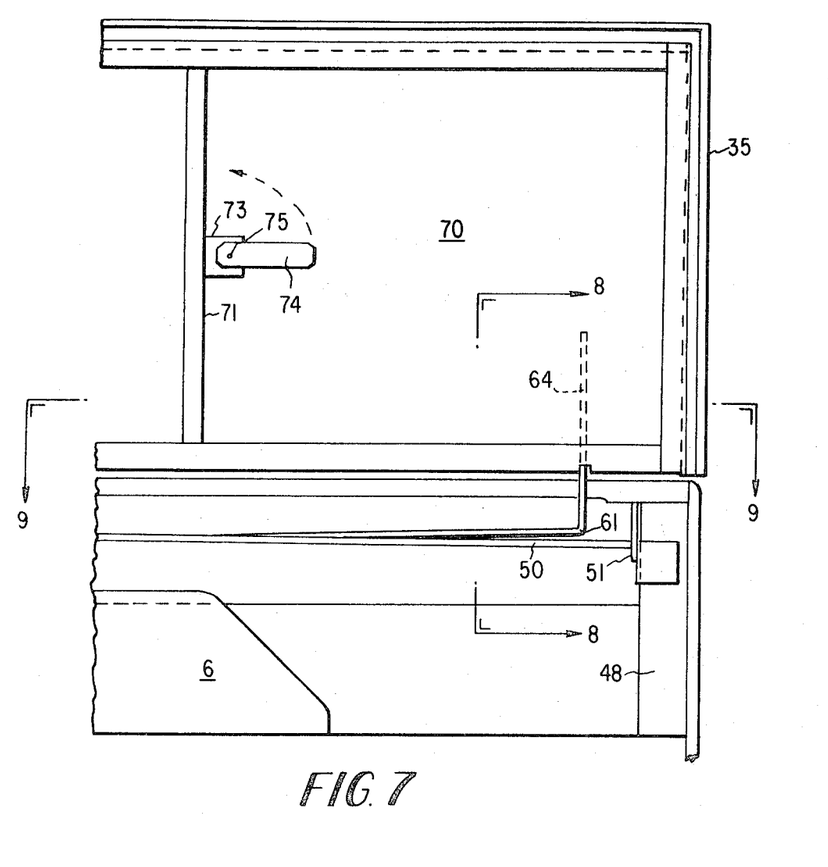
FIG. 7 is a fragmentary elevational view, illustrating the inner surface of one of the side sections.
Figure 8:
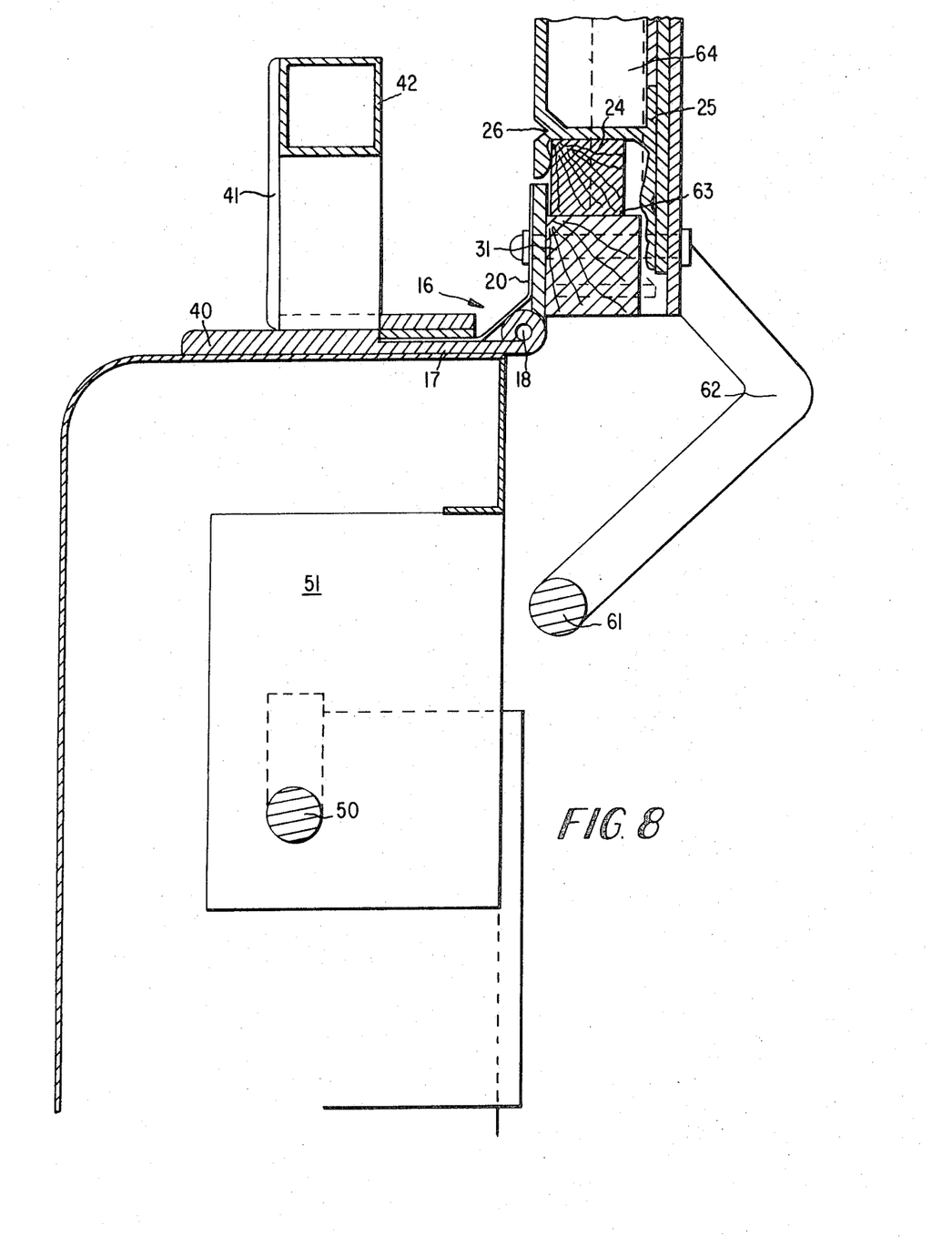
FIG. 8 is a vertical sectional view taken along lines 8 — 8 of FIG. 7.
Figure 9:
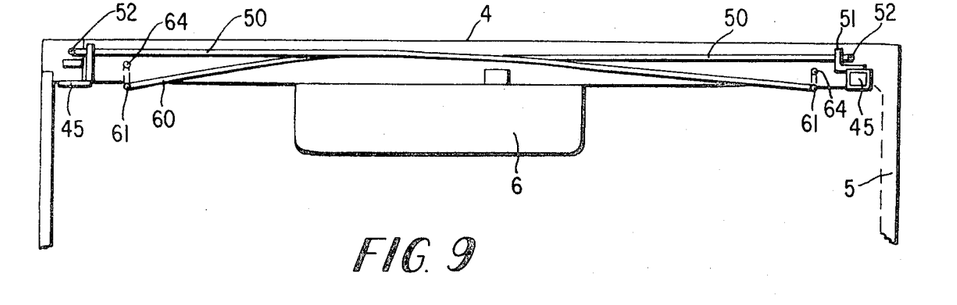
FIG. 9 is a horizontal section taken along lines 9 — 9 of FIG. 7.

Referring now specifically to FIGS. 4 and 7, the rear end sections and front end sections each contain a locking slot 77. Thus, when the end wall sections 12 are placed in face to face relation with the interior surface of sidewall sections 10, there is a tongue 74, pivotably connected at point 75 to plate 73 which swings into engagement with the locking slot 77 to hold said sections into locked engagement as the side sections move medially through the arc from vertical to horizontal position or vice versa. Along the inner surface of the leaflike members forming rear end section 12 are a series of slats 47, pivotably connected to the inner edge of end wall section 12 by means of pivot pin 48. These slats swing gravitationally to almost engage the truck deck 3 when the sidewall sections 10 are in the horizontal plane. This allows a camper or traveler to place a suitcase or other item into the relatively small area defined by the cargo fence 46 and the tailgate 5. Otherwise, as is well know, due to inertia and the stopping and starting of road traffic, an item placed in the rear of the pickup truck will end up near the cab at the end of the journey. This necessitates a person completely raising sidewall sections 10 or trying to climb into the closed compartment area to retrieve an item which had inched forward to the front of the truck compartment during the travel. Of course, if an item is longer than the space provided, the slats 47 pivot back into engagement with the edge of the end wall section 12 to allow such items to lie undisturbed.

Figure 6:
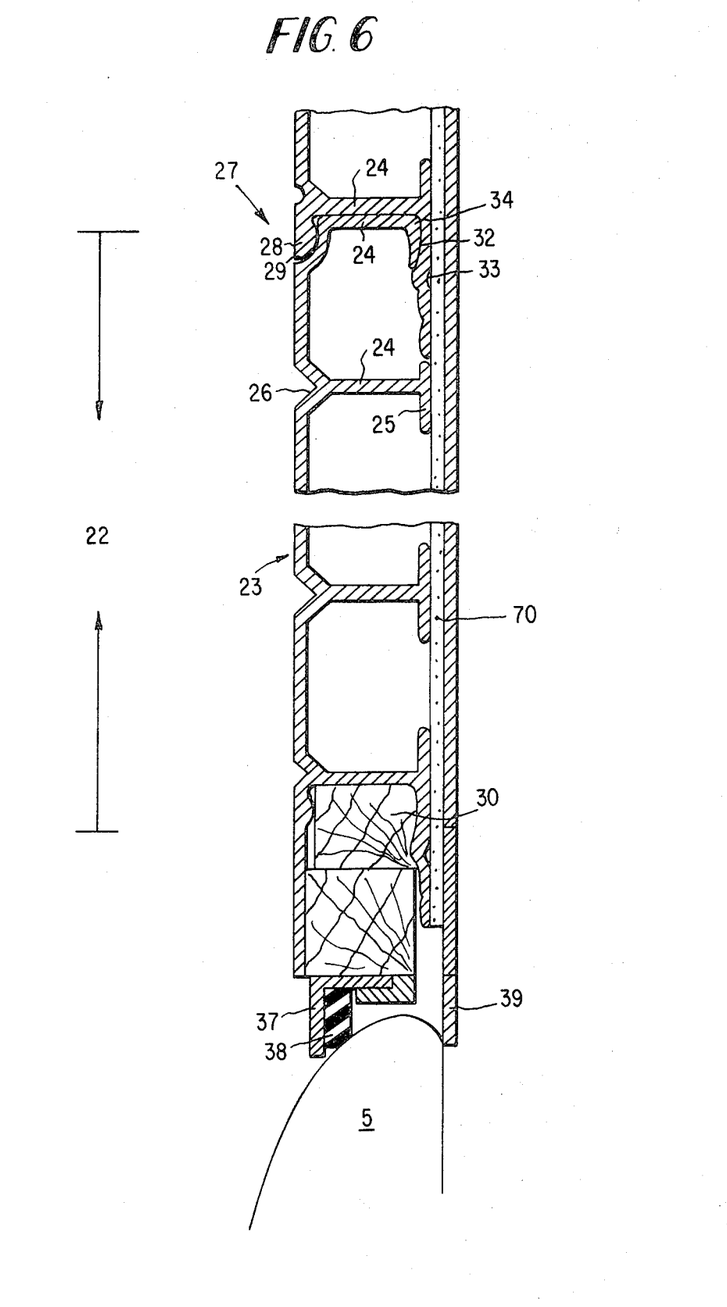
FIG. 6 is a sectional view taken along lines 6 — 6 of FIG. 4.

Another item of interest relative to the end wall sections 12 is the use of exterior stop angles 37 and interior stop angles 39. This is best illustrated in FIG. 6.

Figure 5:
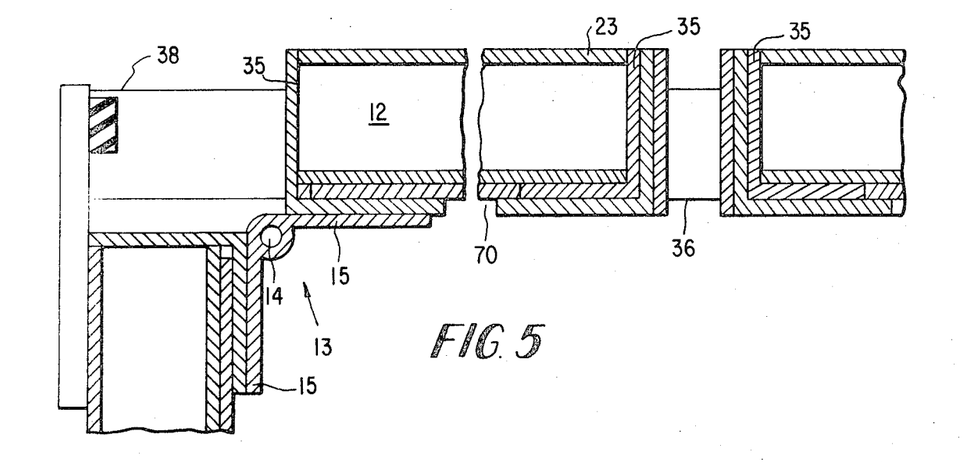
FIG. 5 is a sectional view, taken along lines 5 — 5 of FIG. 4.

As will be noted, the bottom part of the leaflike members of the rear section 12 are filled with a soft wood filler 30 and bolted into position by means of bolt 31. An exterior angle iron 37 is mounted into position and cushioning 38 is added to act as a stop against the outer top part of tailgate 5. A similar angle 39 is provided on the inner edge of the corresponding leaf of rear section 12 to limit the swing of that section by engagement with the inner surface of tailgate 5. Consequently, the rear wall section members are held in vertical alignment with tailgate 5 by means of stop member 37 and 39, respectively, engaging with the inner and outer surfaces of tailgate 5. Of course, a latch member is utilized and this consists of a keeper member 81, a retaining clip 80, and a throw rod 84 and handle 85. Thus, when the end sections 12 are in engagement with the inner and outer surfaces of tailgate 5, respectively, the throw rod 85 is pushed into engagement with the keeper member 81 and the end wall sectons are securely locked in position. An identical latch, of course, is available for the front wall sections 11. Each of the leaflike members forming the front and rear wall sections 10 and 11 respectively are formed by a frame made of angles 35 and are fitted with a closure member 36. See FIG. 5.

Figure 10:
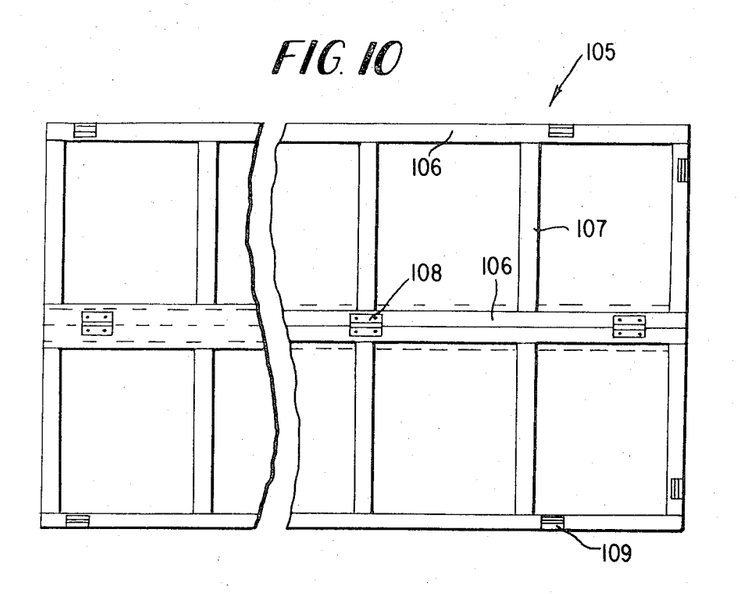
FIG. 10 is a plan view of a hinged supplemental top member for the supplemental vehicle body of this invention.
Figure 11:
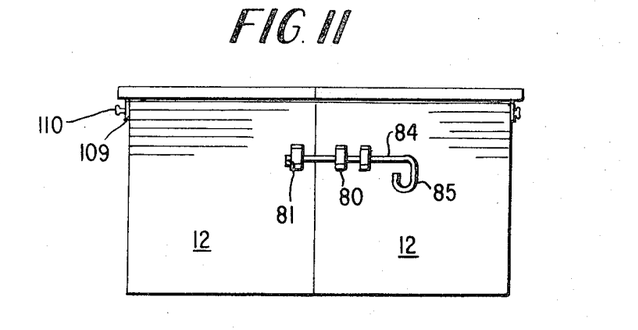
FIG. 11 is an elevational view of the rear wall section of this invention illustrating the relationship of the hinged top member thereto.

As the sidewall sections are moved from their vertical disposition to their closure posture in a horizontal plane parallel to the plane of the truck bed 3, the tailgate 5 is brought into its closed vertical position. This, as previously indicated, forms a closed compartment for storage of valuables, tools, hunting equipment, etc., which can be locked by means of a novel latch forming part of this invention. This latch consists of a throw rod 94, sliding in retaining clips 80 and in keeper 81. The throw rod 94 is bent 90° at point 95 to form an arm 96 and is bent further some 35° at point 97 so that the projecting end of the handle projects down over the top of tailgate 5. As will be apparent, the throw rod not only slides linearly through the retaining clips 80 but pivots around an axis perpendicular to the linear path so as to raise handle 96 in and out of engagement with an open hasp 100. Hasp 100 contains holes 101 at its upper end. Thus, when the handle 96 is brought pivotably downwardly between the two legs of hasp 100 and the projecting bent down tip of handle 96 projects over tailgate 5, a padlock can be placed in hole 101 of the hasp and the entire assembly locked. This forms a locked and waterproof compartment for the entire truck. As has previously been mentioned, the rails 42 and 44 act both as stop and handle members respectively and as tiedown rails so that a large cargo can be lashed onto the deck surface formed by the side wall sections 10 in their compartment closure posture.

ilt will be apparent that the supplemental vehicle of the present invention is admirably suited for use with a supplemental top as a camper or other closed weatherproof compartment. One embodiment of such a supplemental top member is illustrated in FIG. 10 and FIG. 11. This supplemental top is designated 104 and comprises four longitudinal frame members 106, each containing a receiving groove (not shown). Five transversely disposed frame members 107 are fitted into the receiving grooves of frame members 106 and slid into position. A skin (not shown), as for example, aluminum sheet metal, is fitted over said transverse member 107 and into the receiving grooves of longitudinal frame member 106. Hinges 108 join the middle longitudinal frame members 106 together. These hinges are of the type that swing only 180° so that in the position shown in FIG. 10, the cover is absolutely rigid and watertight.

An angle clip 109 is fitted on the under side of the two outer frame members 106 and on the under side of the two end transverse frame members 107. The angle clip 109 contains a set screw 110, which fits into the groove 26 of the aluminum deck section 22. Thus, the rigid hinged supplemental top is securely held in position. It can be removed merely by releasing set screws 110 and pulling the top upwardly in the middle to allow the two hinged halves to fold together in face to face relation. This allows the supplemental top to be easily stored in the closed pickup truck compartment.

Many modifications will occur to those skilled in the art from the detailed description hereinabove given and such description is meant to be exemplary in nature and non-limiting except so as to be commensurate in scope with the appended claims.

I claim:

1. For use with a pickup truck, having an open rear compartment, including:
   A. a truck bed.
   B. vertically disposed sidewall panels and a front wall panel, and
   C. a tailgate, pivotable between open and closed positions:
   D. the improvement of a compartment closure and supplemental vehicle body which comprises:
      1. a pair of heavy duty sidewall sections convertible from a compartment closure and cargo deck, when disposed in a horizontal plane parallel to said truck bed, to sidewall sections of a supplemental vehicle body, when disposed in a vertical plane, in alignment with said sidewall panels of said compartment;
      2. hinge means, pivotably securing one end of each of said sidewall sections to the upper portion of said sidewall panels and providing means for movement of the free end of said wall section through an arc from one plane to another;
      3. means for urging each of said sidewall sections from the horizontal plane to a vertical plane which includes:
         a. a first torsion bar extending essentially the length of said compartment and fixedly mounted at one end to said truck,
         b. a torque arm operatively connected to said torsion bar and to said sidewall section to apply torque to said sidewall section for moving said section from a horizontal plane to a vertical plane and which acts to apply torsion to said torsion bar as said section moves from said vertical plane to said horizontal plane.

2. A compartment closure and supplemental vehicle body, as defined in claim 1, the further combination of:

A. a second torsion bar mounted so as to lie generally co-axially with said first torsion bar but with one end fixedly mounted to the opposite end of said truck relative to said first torsion bar,
   B. a torque arm, operatively connected to said torsion bar and to said sidewall section in spaced relation to the torque arm of said first torsion bar so as to apply torque to said wall section at a point spaced from said first torque arm.

3. A compartment closure and supplemental vehicle body as defined in claim 1, in which the torque arm is formed from one end of said torsion bar, said end of said torsion bar being bent at 90° at one point and being bent at 45° at two points so as to project into said sidwall section along the short axis of said sidewall section.

4. A compartment closure and supplemental vehicle body as defined in claim 1, the further combination of:

A. front and end wall sections, each wall section comprising two flat leaflike members and,
   B. hinges for each wall section, each hinge hingedly securing one of said leaf members along its outer edge to the front or rear edges of one of said opposite sidewall sections, for pivotable movement of said leaf members from face to face registry with the inner surface of said sidewall sections, inwardly into a vertical alignment with said front compartment wall panel and tailgate respectively to cooperatively form the front and end wall sections of said supplemental vehicle body.

5. A compartment closure and supplemental vehicle body as defined in claim 4, the further combination therewith of:
   A. a latch means for latching said leaflike members together, to form said front and rear wall sections.

6. A compartment closure and supplemental vehicle body, as defined in claim 4, the further combination therewith of:
   A. stop members at the lower end of each of said leaf members for engagement with said front wall panel and tailgate for limiting the pivotable movement of said leaf members and to maintain said members in vertical alignment with said front wall panel and tailgate respectively.

7. A compartment and supplemental vehicle body, as defined in claim 6, the improvement of:
   A. stop members disposed on the inner edges and outer edges respectively of said leaf members,
      1. the stop disposed on the inner edge acting to limit the pivotable movement of said leaf member rearwardly by engagement with the inner surface of said tailgate and,
      2. the stop disposed on the outer edge of the second leaf member acting to limit the forward movement of said leaf member against the outer top surface of said tailgate.

8. A compartment closure and supplemental vehicle body as defined in claim 4, the further combination therewith of:
   A. locking slots disposed on the inner medial surface of said leaflike members and,
   B. pivotable tongues disposed on the inner surface of said sidewall sections in operative relation to said locking slots so as to engage with the slot and hold said leaflike members in face to face relationship as the said sidewall sections move from vertical to horizontal position.

9. A compartment closure and supplemental vehicle body, as defined in claim 4, the further combination with said leaflike members of:
   A. a cargo fence, operative when said wall sections are disposed in a horizontal plane to form a barrier in the rear part of said compartment, which comprises:
      1. a series of slats, pivotably connected along the inner surface of said leaf members, said slats being mounted so as to swing gravitationally as said side sections move into a horizontal plane.

10. A compartment closure and supplemental vehicle body, as defined in claim 1, the further combination therewith of:
A. a combination stop and cargo tie-down rail which comprises:
1. a rail disposed in vertically space relation to the sidewall panels of said compartment,
2. said rail serving as a stop rail to limit the pivotable movement of said wall sections past the vertical plane,
3. said stop rail serving as cargo tie-down rails when said sidewall sections are disposed horizontally.

11. A compartment closure and supplemental vehicle body, as defined in claim 1, the further combination therewith of:
A. a combination handle and cargo tiedown rail which comprises:
1. a rail coaxilly disposed in vertically spaced relation to said sidewall section;
2. said rail serving as a handle for raising the sidewall section upwardly from a horizontal plane, and,
3. said rail serving as a cargo tiedown rail when said sidewall sections are in a horizontal plane.

12. A compartment closure and supplemental vehicle body, as defined in claim 1, the further combination therewith of:
A. a combination latch and compartment closure locking mechanism which comprises:
1. a pair of keeper members, each keeper member being mounted on one side of said sidewall sections so as to be in alignment with the other keeper member when said sidewall sections are in a horizontal plane,
2. a throw rod mounted in said keeper member for movement in a longitudinal path and for pivotable movement around an axis normal to said longitudinal path,
3. a handle extending from said throw rod to the rear of said tailgate, said handle being bent near its end to project over the top of said tailgate, and to secure said tailgate in closed position,
4. an open hasp, mounted between said tailgate and said throw rod for reception of said handle, and,
5. holes in said hasp for reception of a lock.

13. For use with a pickup truck, having an open rear compartment including:
A. a truck bed,
B. vertically disposed sidewall panels and a front wall panel,
C. a tailgate pivotable between open and closed positions,
D. the improvement of a compartment closure and supplemental vehicle body, which comprises:
1. a pair of sidewall sections convertible from a compartment closure when disposed in a horizontal plane, parallel to said truck bed, to sidewall sections of a supplemental vehicle body, when disposed in a vertical plane in alignment with said sidewall panels of said compartment;
2. hinge means, pivotably securing one end of each of said sidewall sections to the upper portion of said sidewall panels and providing means for movement of the free end of said wall section through an arc from one plane to another;
3. means for urging each of said sidewall sections from a horizontal plane to a vertical plane;
4. the further combination therewith of:
a. front and end wall sections, each wall section comprising two flat leaflike members,
b. hinges for each wall section, each hinge hingedly securing one of said leaf members along its outer edge to the front or rear edges respectively of one of said opposite sidewall sections, for pivotable movement of said leaf members from face to face registry with the inner surface of said sidewall section, inwardly into vertical alignment with said front compartment wall panel and tailgate respectively to cooperatively form the front and end wall sections of said supplemental vehicle body.

14. A compartment closure and supplemental vehicle body, as defined in claim 13, the further combination therewith of latch means for latching said leaflike members together to form said front and rear wall sections.

15. A compartment closure and supplemental vehicle body, as defined in claim 13, the further combination therewith of:
A. stop members at the lower end of each of said leaf members for engagement with said front wall panel or tailgate for limiting the pivotable movement of said leaf member and for maintaining said leaf member in vertical alignment.

16. A compartmental closure and supplemental vehicle body, as defined in claim 13, the further combination of:
A. a stop member disposed on the inner and outer edges respectively of said leaf members,
1. the stop disposed on the inner edge limiting the pivotable movement of said leaf member rearwardly by engagement with the inner surface of said tailgate, and,
2. the stop disposed on the outer edge of the second leaf member, limiting the pivotable movement of said leaf member against the outer top surface of said tailgate.

17. A compartment closure and supplemental vehicle body, as defined in claim 13, the further combination therewith of:
A. lock slots disposed on the inner medial surface of said leaf-like members and,
B. pivotable tongues disposed on the inner surface of said sidewall sections in operative relation to said locking slots so as to engage the slot and hold said leaflike members in face to face relationship as the said sidewall members move from vertical to horizontal positions.

18. A compartment closure and supplemental vehicle body, as defined in claim 13, the further combination with said leaflike members of:
A. a cargo fence operative when said side sections are disposed in a horizontal plane to form a barrier in the rear part of said compartment, which comprises:
1. a series of slats, pivotably connected along the inner edge of said leaf members,
a. said slats being mounted so as to swing gravitationally as said sidewall sections move from one plane to another.

19. For use with a pickup truck, having an open rear compartment, including:

A. a truck bed,
B. vertically disposed sidewall panels and a front wall panel,
C. a tailgate, pivotable between open and closed positions,
D. the improvement of a compartment closure and supplemental vehicle body which comprises:
  1. a pair of sidewall sections convertible from a compartment closure when disposed in a horizontal plane parallel to said truck bed, to sidewall sections of a supplemental vehicle body, when disposed in a vertical plane in alignment with said sidewall panels of said compartment.
  2. hinge means pivotably securing one end of each of said sidewall sections to the upper portion of said sidewall panels and providing means for movement of the free end of said wall sections through an arc from one plane to another.
  3. means for urging each of said wall sections from a horizontal plane to a vertical plane,
  4. the further combination therewith of:
    a. a combination stop and cargo tiedown rail which comprises:
      1. a rail disposed in vertically spaced relation to the sidewall panels of said compartment,
      2. said rail serving as a stop rail to limit the pivotable movement of said wall section past said vertical plane,
      3. said stop rail serving as a cargo tiedown rail when said sidewall sections are disposed horizontally.

20. For use with a pickup truck, having an open rear compartment, including:
A. a truck bed,
B. vertically disposed sidewall panels and a front wall panel,
C. a tailgate pivotable between open and closed positions,
D. the improvement of a compartmental closure and supplemental vehicle body which comprises:
  1. a pair of sidewall sections, convertible from a compartment closure, when disposed in a horizontal plane, to sidewall sections of a supplemental vehicle body when disposed in a vertical plane in alignment with sidewall panels of said compartment;
  2. hinge means, pivotably securing one end of each of said sidewall sections to the upper portion of said wall panels and providing means for movement of the free end of said sidewall section through an arc from one plane to another;
  3. means for urging each of said sidewall sections from a horizontal plane to a vertical plane;
  4. the further combination therewith of:
    a. combination handle and cargo tiedown rail which comprises:
      1. a rail coaxially disposed in vertically spaced relation to said sidewall section,
      2. said rail serving as a handle for raising said sidewall section upwardly from a horizontal plane, and,
      3. said rail serving as a cargo tiedown rail when said sidewall sections are in a horizontal plane.

21. For use with a pickup truck, having an open rear compartment including:
A. a truck bed,
B. vertically disposed sidewall panels and a front wall panel,
C. a tailgate pivotable between open and closed positions,
D. the improvement of a compartment closure and supplemental vehicle body which comprises:
  1. a pair of sidewall sections, convertible from a compartment closure, when disposed in a horizontal plane, parallel to said truck bed, to sidewall sections of a supplemental vehicle body, when disposed in a vertical plane in alignment with said sidewall panels of said compartment:
  2. hinge means pivotably securing one end of each of said sidewall sections to the upper portion of said sidewall panels and providing means for movement of the free end of said wall sections through an arc from one plane to another.
  3. means for urging each of said sidewall sections from a horizontal plane to a vertical plane;
  4. a combination latch and compartment closure locking mechanism, which comprises:
    a. a pair of keeper members, each keeper member being mounted on one of said sidewall sections so as to be in alignment with the other member when said sidewall sections are in horizontal position,
    b. a throw rod, mounted in said keeper member for movement in a longitudinal path and for pivotable movement around an axis normal to said longitudinal path,
    c. a handle, extending from said throw rod to the rear of said tailgate, said handle being bent near its end to project over the top of said tailgate and to secure said tailgate in closed position,
    d. an open hasp, mounted between said tailgate and said throw rod for reception of said handle,
    e. holes in said hasp for reception of a lock.

* * * * *